United States Patent [19]

Masaoka et al.

[11] 4,218,604
[45] Aug. 19, 1980

[54] METHOD FOR WELDING OF AUSTENITIC STAINLESS STEEL PIPING

[75] Inventors: Isao Masaoka; Katsuyuki Imai, both of Hitachi, Japan

[73] Assignee: Hitachi, Ltd., Tokyo, Japan

[21] Appl. No.: 897,694

[22] Filed: Apr. 19, 1978

[51] Int. Cl.² .......................................... B23K 31/06
[52] U.S. Cl. ................................. 219/61.7; 228/46; 228/222
[58] Field of Search ............... 219/61.7, 8.5; 239/132.5, 488, 590, 590.3, 590.5; 148/136; 228/46, 200, 222

[56] References Cited

U.S. PATENT DOCUMENTS

| | | | |
|---|---|---|---|
| 2,259,367 | 10/1941 | Ely et al. | 228/46 |
| 2,574,003 | 11/1951 | Wymer, Jr. | 239/590.3 |
| 3,802,681 | 4/1974 | Pfeifer | 239/132.5 |
| 4,152,568 | 5/1979 | Yamaguchi et al. | 219/61.7 |

FOREIGN PATENT DOCUMENTS

2758528  7/1978  Fed. Rep. of Germany .......... 219/61.7

52-22539  2/1977  Japan ..................... 219/61.7

OTHER PUBLICATIONS

*Welding Handbook;* Section 3A; Sixth Edition; American Welding Society; N.Y. 1970; p. 44.64.

*Primary Examiner*—B. A. Reynolds
*Assistant Examiner*—Keith E. George
*Attorney, Agent, or Firm*—Craig & Antonelli

[57] ABSTRACT

A method for butt welding of austenitic stainless steel piping with forced cooling of the inside by the flow of a cooling medium comprises the steps of initially welding the pipe ends together by a root pass prior to the inflow of the cooling medium so as to prevent leakage of the medium to the outside, introducing an insert for constraining the flow of the cooling medium into the pipe, and welding the junction while forcing the medium to flow through the space between the insert and the surrounding wall of the pipe, the insert constructed so that it increases the flow velocity of the cooling medium to the maximum in the vicinity of the welded joint being formed.

10 Claims, 16 Drawing Figures

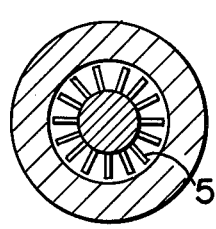
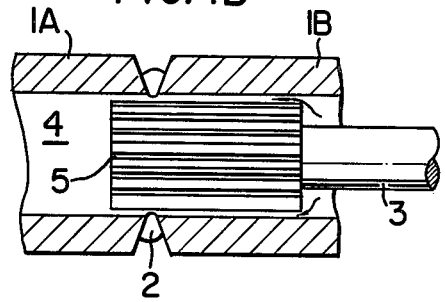
FIG.4A   FIG.4B
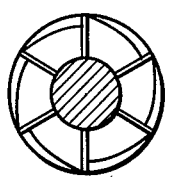
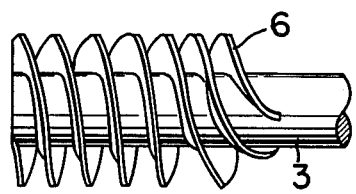
FIG.5A   FIG.5B
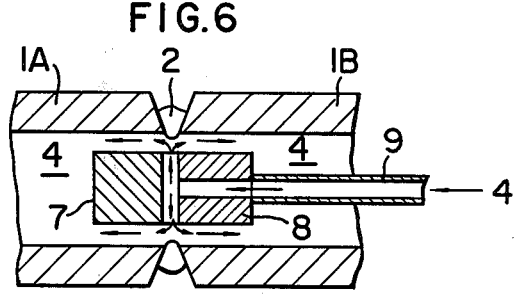
FIG.6

METHOD FOR WELDING OF AUSTENITIC STAINLESS STEEL PIPING

This invention relates to a method for welding austenitic stainless steel piping, and more specifically to a welding method which will reduce the possibility of stress corrosion cracking of the inner surfaces of welds in austenitic steel pipes exposed to corrosive environments.

Generally, when austenitic stainless steels are heated to 500°–800° C., the carbon in solid solution with the austenite structure tends to produce chromium carbide precipitation in the form of netting along the crystal grain boundary, forming a chromium deposition layer in that portion and causing intercrystalline corrosion in corrosive environments, with a corresponding loss of the corrosion resistance. This carbide precipitation is observed when the steel is subjected to an enhanced temperature even for a relatively short period of time, for example, for welding. The resulting welds have the drawback of intercrystalline stress corrosion cracking in certain environments due to residual stresses and stresses developing during operation, in addition to the carbide precipitation. In welding actual structures of austenitic stainless steels, therefore, it is customary to take countermeasures for minimizing the carbide precipitation, for example, by decreasing the welding heat input and lowering the interpass temperature.

Stress-relief annealing, which may appear appropriate for relieving the residual stresses in the heat affected zones of welds, is actually seldom used, because the annealing in the temperature range of 500°–800° C. causes a loss of corrosion resistance due to the carbide precipitation and the heating at over 850° C. tends to invite deformation as a result of the heat treatment. Also, the peening process, apparently applicable for the reduction of residual stresses upon welding, involves such diverse difficulties in application on the inner pipe surfaces of the welded portions that the employment of the process is hardly feasible.

In an attempt to overcome those difficulties in the butt welding of austenitic stainless steel pipes, it has been proposed to weld the pipe ends together while cooling the junction. However, external cooling of the welds is not effective enough to prevent the carbide precipitation in the heat affected zones, and mere circulation of cooling water through the pipe does not reduce the residual stresses on the inner surface of the pipe, thus rendering it very difficult to preclude the stress corrosion cracking.

The present invention has for its object to provide a welding method which solves the foregoing problems in the butt welding of austenitic stainless steel piping and which prevents the development of stress corrosion cracking of the welds through remarkable reduction of carbide precipitation as well as of tensile residual stresses due to welding.

The object of the invention is achieved by either of the following two inventions.

The first invention resides, in essence, in a method for butt welding austenitic stainless steel piping with forced cooling of the inside, which comprises the steps of initially welding the pipe ends together by a root pass prior to the inflow of the cooling medium so as to prevent leakage of the medium to the outside, introducing an insert for constraining the flow of the cooling medium into the pipe, and welding the junction while forcing the medium to flow through the space between the insert and the surrounding wall of the pipe, the insert being constructed so that it increases the flow velocity of the cooling medium to the maximum in the vicinity of the welded joint being formed.

The second invention resides, in essence, in a method for butt welding austenitic stainless steel piping with forced cooling of the inside, which comprises the steps of initially welding the pipe ends together by a root pass prior to the inflow of the cooling medium so as to prevent leakage of the medium to the outside, introducing an insert for constraining the flow of the cooling medium into the pipe, and welding the junction while forcing the cooling medium, by means of the insert, to impinge upon the welded joint being formed, at right angles thereto, and then flow through the constrained flow path formed between the insert and the surrounding wall of the pipe over distances of at least 25 mm each upstream and downstream from the welded joint.

In view of the fact that the stress corrosion cracking that develops in the welds of austenitic stainless steel piping is largely ascribable to the chromium carbide precipitation and tensile residual stresses in the weld on the inner pipe surface, extensive searches have been made for means which would reduce or relieve the two factors. As a result, it has now been found that the cooling medium proves strikingly effective when it is allowed to cool the weld on the inner surface of the pipe with the aid of means for ensuring good heat transfer. It has been clarified that, whereas natural or circulatory flow of the cooling medium through the pipe is little effective in correcting the aforesaid two causes of cracking, a substantially favorable effect is attained by inserting a special jig into the pipe and thereby constraining the flow of the cooling medium and increasing the flow velocity of the medium along the junction being welded and the heat affected zone.

The detail and examples of the invention will be described below with reference to the accompanying drawings.

FIGS. 1 through 5 are sectional views of typical inserts for use in the first invention;

FIGS. 6 through 8 are sectional views of typical inserts for use in the second invention;

First, the pipe ends of austenitic stainless steel to be joined are welded by a pass or two lest water or suchlike cooling medium to be forced to cool the inner surface of the pipe leak out from between the ends. Next, an insert capable of constraining the flow of the cooling medium in the pipe is introduced. Without the insert, simple flow of the cooling medium through the pipe, as in the common practice, would make the flow velocity of the medium highest in the axial center of the pipe and very low along the inner wall surface where a welded joint is to be formed, with an accordingly reduced cooling effect. The tendency is more and more pronounced with pipes of larger diameters. To avoid this, the insert of a construction such as to alter the flow pattern of the cooling medium compulsorily to produce the maximum flow velocity in the vicinity of the junction to be welded, is introduced into the pipe to offer extremely effective cooling and remarkable saving of the cooling medium consumption. While water usually serves adequately as the cooling medium, other fluid, such as oil, may be employed instead.

EXAMPLE 1

Figure 1:
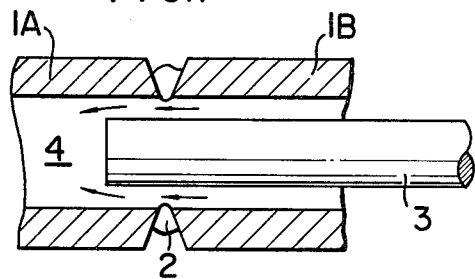

FIG. 1 illustrates an example of the first invention in the simplest form. Abutted pipe ends 1A, 1B of austenitic stainless steel pipe are first welded by a pass or two on the root of the groove so that the deposited metal provides hermetic seal on the inner surface of the pipe to prevent leakage of the cooling medium 4 from the inside. Next, a column having an outside diameter smaller than the inside diameter of the pipe is introduced as an insert 3. The inner end of the insert 3 should extend toward the outlet of the cooling medium, at least at a distance of 25 mm, preferably about 50 mm, downstream from the point 2 where a welded joint is to be formed. This columnar insert 3 alters the flow pattern of the cooling medium; the flow velocity which would otherwise be the highest in the axial center of the pipe is now high along the inner wall surface that includes the junction 2 being welded. Consequently, the cooling effect is enhanced and the pipe portions at least 25 mm each upstream and downstream from the point immediately below the heat affected zone can be effectively cooled.

EXAMPLE 2

Figure 2:
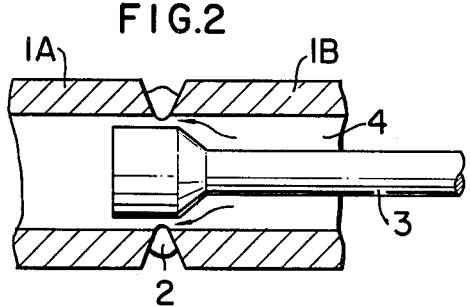

FIG. 2 shows another example of the first invention. In this case the insert 3 is small in outside diameter of the column on the upstream side. The diameter gradually increases toward the junction 2 to be welded and reaches the maximum immediately under the junction. In the presence of the insert 3, the cooling medium 4 does not merely flow in parallel with the surrounding wall of the pipe but is diverted at a point just before the junction 2 and impinges at a given angle upon that part of the inner wall surface to attain an improved cooling effect. Thus, as the diameter of the insert 3 gradually increases, the space between itself and the surrounding wall of the pipe decreases with a corresponding reduction in the cross sectional area of the flow path. As a consequence, the flow velocity of the cooling medium progressively increases to the maximum in the vicinity of the junction 2 for an even better cooling effect. For the gradual change in the space, choice of proper conditions according to the wall thickness and inside diameter of the steel piping to be welded is essential.

EXAMPLE 3

Figure 3:
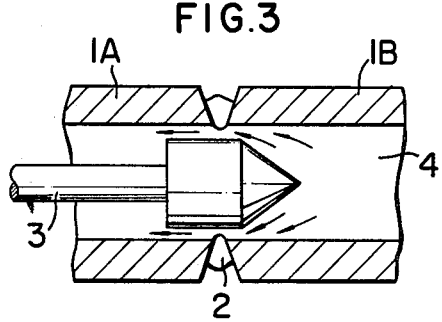

FIG. 3 shows a modification of Example 2. Here the insert 3 is cone-shaped at the head or is pointed upstream, and is followed by a column facing the junction 2 to be welded, thereby sharply decreasing the cross sectional area of the flow path and increasing the flow velocity of the cooling medium for an enhanced cooling effect.

EXAMPLE 4

FIG. 4 shows another modified example of the first invention, in a cross section (A) and a side section (B). The columnar insert 3 here has a plurality of axially extended, radial partitions or fins 5 set in parallel on its outer periphery to allow the cooling medium 4 to cool the junction 2 uniformly. This arrangement is useful in effectively cooling the junction 2 to be welded with a small amount of the cooling medium. Such a consideration is not necessary where a large volume of the medium is available.

EXAMPLE 5

FIG. 5 shows an insert 3 with spiral fins 6 in place of the straight fins used in FIG. 4, as a cross sectional view (A) and a side elevational view (B). The arrangement is as effective as that of Example 4.

The detail and examples of the second invention will now be described with reference to the accompanying drawings.

First, the pipe ends to be joined by welding are welded by a pass or two to avoid leakage of the cooling medium from the inside. Then, an insert for compulsorily changing the flow pattern of the cooling medium is introduced into the pipe. The insert is constructed to special configurations so that the cooling medium can impinge on the junction at right angles thereto. Following the impingement, the cooling medium is parted at right angles to the junction and directed upstream and downstream along the inner wall surface of the pipe. Thus, the pipe welding is carried out while the medium is flowing through the space defined between the insert and the surrounding wall of the pipe, at a distance of at least 25 mm each upstream and downstream from the welded joint being formed. In brief, the invention provides a method for welding austenitic stainless steel piping, which comprises achieving an improved cooling effect with the cooling medium caused to impinge at right angles to the underside of the pipe ends to be joined by welding, and then welding the junction while cooling the heat affected zone by the subsequent flow of the cooling medium through the constrained flow path at least 25 mm each upstream and downstream from the welded joint being produced.

EXAMPLE 6

FIG. 6 is a sectional side view of an example of the second invention. Pipe ends 1A, 1B, of austenitic stainless steel are abutted against each other, and are joined by a root run with deposited metal 2 to avoid leakage of the cooling medium 4 from the inside. An insert 3 of the following construction is then introduced into the pipe. With the circular cross section through the pipe ends 1A, 1B as the boundary, two columns 7, 8 are held symmetrically apart. An inlet pipe 9 for the cooling medium pierces through the axial center of one column 8 and is open to the opposing face of the other column 7. The columns 7, 8 have a diameter smaller than the inside diameter of the pipe ends 1A, 1B, and are at least 25 mm in length each. The insert embodied here, with the construction above described, functions as follows. The cooling medium 4 admitted into the inlet pipe 9 at one end flows out and impinges on the opposing face of the other column 7, and then is directed radially through the circular space formed between the opposing ends of the two columns 7, 8. At the periphery of the circular space the medium impinges, radially and at right angles to the inner wall surface, upon the underside of the junction 2, cooling the latter rapidly. The cooling medium 4 is thence divided into leftward and rightward subflows, which proceed in the respective directions through the cylindrical space formed between the two columns 7, 8 and the surrounding pipe wall. The subflow past the column 7 flows in the same direction as the fresh medium being introduced, while the subflow past the column 8 is discharged countercurrent. Since the columns 7, 8 are at least 25 mm long each, the at least 25 mm-long portion of each constrained flow path is reduced in cross sectional area. Consequently, the flow velocity is sharply increased and the pipe portion at least 25 mm each upstream and downstream of the heat affected zone is quite rapidly cooled. The outside diameter of the opposing columns 7, 8, the circular gap between the opposing column faces, the inside diameter of the inlet pipe 9, and other dimensions are suitably determined by the inside and outside diameters of the piping to be welded, flow velocity and temperature of the cooling medium, and other related factors.

A prior art method of effecting the impingement of cooling medium on the junction being welded is by issuance of the fluid from an annular nozzle or the like. When such a nozzle is employed, proper conditions must be chosen, because air bubbles will form on the inner surface of the pipe being welded, making adequate cooling impossible. If the insert embodied in this example of the invention is used instead, no bubbling will take place and satisfactory heat transfer and cooling will be effected through continuous and effective contact of the cooling medium with the inner pipe surface of the weld 2. While water is a satisfactory cooling medium in this case, oil or other special cooling medium may be employed as well.

EXAMPLE 7

Figure 7:
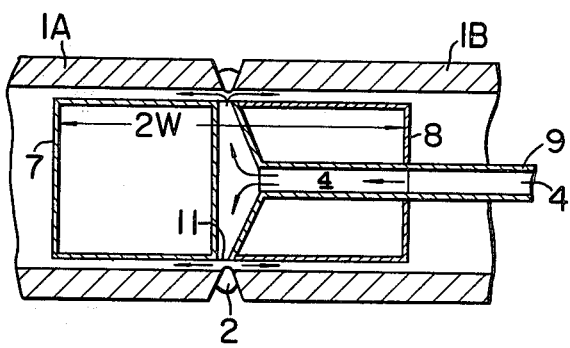

FIG. 7 shows a modified example of the second invention. In this case the column 8 shown in Example 6 is concave at the inner end. Also, the inlet pipe 9 has a larger inside diameter, and the circular space formed between the opposing columns 7, 8 is gradually narrowed toward the periphery. The flow velocity pf the cooling medium, therefore, is the highest at the annular opening 11 immediately below the weld 2, and this is effective for rapid cooling of the weld and the heat affected zone.

EXAMPLE 8

Figure 8A:
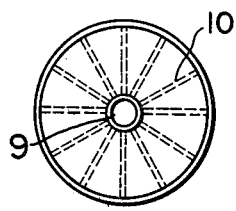
Figure 8B:
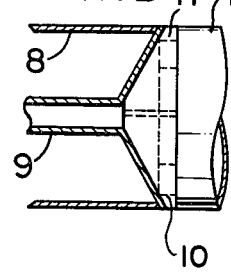

FIG. 8 shows a modified two-column insert in which the space between the opposing ends of the two columns 7, 8 of Example 7 is provided with a plurality of partitions 10 extending radially from the opening of the inlet pipe 9 as the center, (A) being a plan view of the inner end of the column 8, and (B) a sectional side view of the space between the opposing ends of the columns 7, 8. This arrangement is beneficial when a small amount of the cooling medium 4 is to be uniformly issued from the opening immediately below the junction 2 at the inner pipe surface, whereas the partitions are not needed when a large supply of the cooling medium is available.

Although the partitions 10 in this example radially extend at right angles to the surrounding wall of the pipe, they may be spiralled, as an alternative, to direct the cooling medium swirlingly against the junction 2. The latter enables a small volume of the cooling medium to cool the junction 2 being welded and the heat affected zone effectively.

EXAMPLE 9

In order to confirm the advantages of the present invention, the method was applied to butt welding of an austenitic stainless steel pipe, grade AISI 304, having an outside diameter of 114.3 mm and a wall thickness of 8.6 mm. The experiments were conducted with a horizontally fixed pipe, and welding was done in all positions from the bottom upward. Water was used as the cooling medium and, to prevent leakage of water to the outside, the abutted pipe ends were initially joined by three passes of gas tungsten arc welding before the introduction of the cooling medium.

Next, using the insert described in Example 8 and shown in FIG. 8, welding was carried out from the fourth pass onward by shielded metal arc welding while flowing water through the pipe. The outside diameter of the insert members 7, 8, which had only to be approximately 10 mm smaller than the inside diameter of the pipe being welded, was 87 mm. The distance between the columnar insert members 7, 8 and the annular junction forming the inner pipe surface was 5 mm. The column-to-column gap through which the cooling water was to impinge on the junction 2 in a jet at right angles thereto was 3 mm. The height of each column, on the length of the constrained flow path between each column and the surrounding wall of the pipe, was 50 mm. The flow rate of water was 10 liters a minute.

Figure 9A:
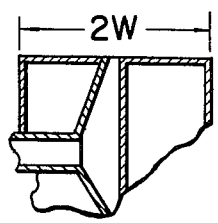
FIG. 9(A) is a fragmentary sectional view of the insert shown in FIG. 8.
Figure 9B:
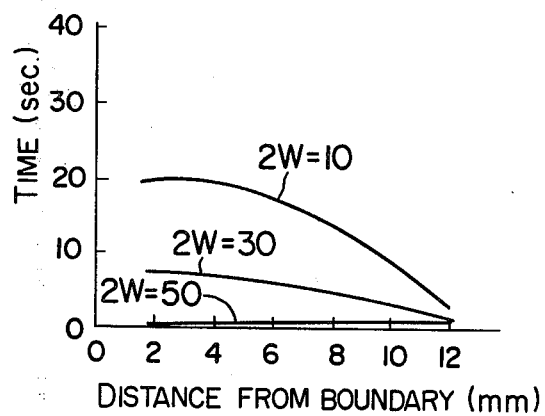
FIG. 9(B) is a graph showing the relationship between the length of the constrained flow path extended in right-angled directions from the radial cooling water spout of the insert shown in FIG. 8 and the period of time for which the weld portion at the top of the pipe is held at the carbide precipitation temperature of 500°–800° C.

FIG. 9 indicates the relationship between the overall length of the constrained flow path between the insert and the surrounding pipe wall, 2W, and the period of time for which the heat affected zone was maintained in the carbide-precipitating temperature range of 500°–800° C., as graphically represented on the basis of the results of heat cycle in the 12 o'clock position (top) of the inner surface of the pipe during welding experiments according to the invention. FIG. 9 shows such relations during water cooling where the length 2W of the constrained flow path was 10 mm, 30 mm, or 50 mm. As can be seen from the graph, with the inserts having the length 2W of less than 50 mm, or less than 25 mm upstream or downstream from the junction, there is a danger of temperature rise to the carbide-precipitating range of 500°–800° C. To avoid the danger, the constrained flow path must be at least 25 mm long each upstream and downstream.

Figure 10:
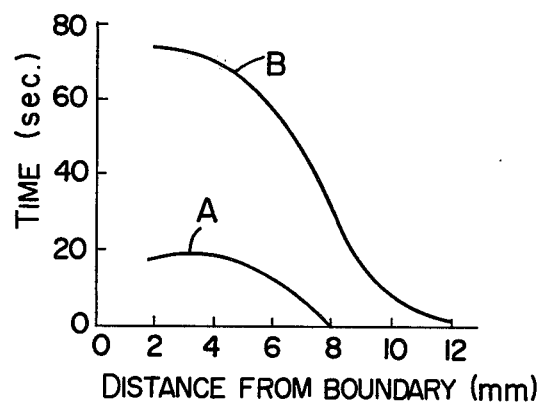
FIG. 10 is a graph similar to FIG. 9 but comparing the relationship according to the method of the invention (A) with that of the prior art (B)

FIG. 10 is a graphic representation of relationship similar to FIG. 9. It shows the periods of time for which the inner surface portion, in the 12 o'clock (top) position, of a pipe 114.3 mm in outside diameter and 8.6 mm in wall thickness was maintained in the carbide-precipitating temperature range of 500°–800° C. The curve A, which represents the experimental results according to the invention, shows little increase in the temperature, whereas the curve B of a conventional method, in which no insert was used but simply cooling water was flown through the pipe, shows an appreciable rise of the temperature. The slight increase in temperature indicated by the curve A of the present method reflects the temperature rise prior to the water cooling.

Figure 11A:
FIG. 11(A) is a partly broken perspective view of a pipe welded in accordance with the invention.
Figure 11B:
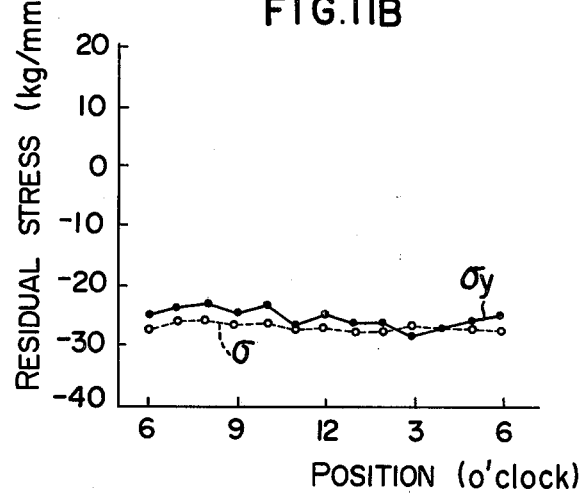
FIG. 11(B) is a graph indicating the residual stress distributions in different portions of the weld formed by the method of the invention.

FIG. 11 gives exemplary results of measurement of residual stresses in the welded joint of an austenitic stainless steel pipe, grade AISI 304, 216.3 mm in outside diameter and 12.7 mm in wall thickness and welded in accordance with the method of the invention. In the graph, the positions (o'clock) on the abscissa indicate the portions on a clock dial imagined in a cross section of the pipe. Welding in this series of experiments was performed with a horizontally fixed pipe, with a welding heat input of 11,000–18,000 J/cm and a water flow rate of 10 liters a minute. It can be seen from the graph that the residual stresses are compressive stresses in the range from $-22.3$ to $-28.5$ kg/mm$^2$, substantially uniform in value circumferentially. In the graph, the line $c_x$ represents the residual stresses in the longitudinal direction of the steel pipe and the line $o_y$, the residual stresses in the direction of the center axis.

The joint thus formed by welding was subjected to a corrosion test by immersion in a boiling aqueous solution containing 42% magnesium chloride for 120 hours in order to determine the residual stress distribution and inspect for cracks due to the residual stresses. No crack was found throughout the weld. In other words, it was ascertained that the residual stresses in the weld were not tensile but compressive stresses throughout.

The results of experiments with the insert revealed in Example 8 have so far been described. Aside from those, another series of welding experiments were conducted using the other inserts illustrated in FIGS. 1 through 7. Each weld was immersed in a boiling aqueous solution of 42% magnesium chloride for 120 hours, and then was inspected for cracking. All of the test pieces were crackless, indicating the beneficial effect of the invention.

In the method for welding austenitic stainless steel piping in accordance with the invention, as already stated, pipe ends are preliminarily joined by welding, a special insert is introduced into the pipe being welded, and welding is done while effectively cooling the junction and heat affected zone with a constrained flow of a cooling medium. The method is, therefore, highly effective in reducing and relieving the chromium carbide precipitation and residual stresses, and in preventing or markedly inhibiting the stress corrosion cracking of the weld in corrosive environments.

What is claimed is:

1. A method for butt welding austenitic stainless steel piping with forced cooling of the inside by the flow of a cooling liquid, which comprises the steps of initially welding the pipe ends of the austenitic stainless steel piping together by a root pass prior to the inflow of said cooling liquid so as to prevent leakage of said liquid to the outside, introducing an insert for forcibly changing the flow pattern of said cooling liquid into said piping, and welding the junction while forcing said liquid to flow through the space between said insert and the surrounding wall of said piping, wherein said insert is a column, cylinder, or cone having an outside diameter smaller than the inside diameter of said steel piping, and which forms a minimum constrained flow path between itself and the surrounding wall of said piping over a length of at least 25 mm from said welded joint being formed toward the outlet for said cooling liquid, said insert being constructed so that it increases the flow velocity of said cooling liquid to the maximum in the vicinity of the welded joint being formed, whereby the welded joint being formed is cooled to reduce chromium carbide precipitation and tensile residual stresses thereat.

2. A method according to claim 1, wherein the diameter of the insert increases from upstream of the junction to a point immediately under the junction, whereby the cooling liquid is diverted before the junction and impinges at an angle against the junction.

3. A method for butt welding austenitic stainless steel piping with forced cooling of the inside by the flow of a cooling liquid, which comprises the steps of initially welding the pipe ends of the austenitic stainless steel piping together by a root pass prior to the inflow of said cooling liquid so as to prevent leakage of said liquid to the outside, introducing an insert for forcibly changing the flow pattern of said cooling liquid into said piping, and welding the junction while forcing said liquid to flow through the space between said insert and the surrounding wall of said piping, said insert being constructed so that it increases the flow velocity of said cooling liquid to the maximum in the vicinity of the welded joint being formed, whereby the welded joint being formed is cooled to reduce chromium carbide precipitation and tensile residual stresses thereat, wherein said insert is provided with a plurality of partitions on the outer surface, whereby said cooling liquid is flown substantially uniformly between said insert and said weld in the surrounding wall of said piping while welding is in progress.

4. A method according to claim 3, wherein said partitions arranged axially of said insert protrude radially from said outer surface of said insert.

5. A method according to claim 3, wherein said partitions are spirally secured to said outer surface of said insert.

6. A method for butt welding austenitic stainless steel piping with forced cooling of the inside by the flow of a cooling liquid, which comprises the steps of initially welding the pipe ends of the austenitic stainless steel piping together by a root pass prior to the inflow of said cooling liquid so as to prevent leakage of said liquid to the outside, introducing an insert for forcibly changing the flow pattern of said cooling liquid into said piping, and welding the junction while forcing said cooling liquid, by means of said insert, to impinge upon the welded joint being formed, at right angles thereto, and then flow through the constrained flow path formed between said insert and the surrounding wall of said piping over distances of at least 25 mm each upstream and downstream from said joint being formed, said constrained flow path being substantially parallel longitudinally to the surrounding wall of said piping, whereby the welded joint being formed is cooled to reduce chromium carbide precipitation and tensile residual stresses thereat.

7. A method according to claim 6, wherein said insert has a length of at least 25 mm each upstream and downstream from the plane across the center of the annular weld and has an outside diameter smaller than the inside diameter of said piping, with a diametral cooling liquid passage formed midway to cause impingement of said liquid upon said weld, said insert including a cooling liquid inlet pipe extended therethrough in communication with said passage.

8. A method according to claim 7, wherein said cooling liquid passage formed diametrally in said insert to cause impingement of said liquid upon said weld is provided with a plurality of radially arranged partitions, whereby said cooling liquid is forced to impinge substantially uniformly upon said weld while welding is in progress.

9. A method according to claim 7, wherein said diametral cooling liquid passage is gradually narrowed toward its periphery.

10. A method according to claim 7, wherein the diametral cooling liquid passage is constructed such that it forces the cooling liquid to impinge substantially uniformly upon said weld over the entire circumference of the piping.

* * * * *